(12) United States Patent
Wu et al.

(10) Patent No.: US 9,778,403 B2
(45) Date of Patent: Oct. 3, 2017

(54) QUANTUM ROD FILM

(71) Applicant: BenQ Materials Corporation, Taoyuan (TW)

(72) Inventors: Jian-Hung Wu, Taoyuan (TW); Shih-Wei Chao, Taoyuan (TW)

(73) Assignee: BenQ Materials Corporation, Taoyuan (TW)

( * ) Notice: Subject to any disclaimer, the term of this patent is extended or adjusted under 35 U.S.C. 154(b) by 76 days.

(21) Appl. No.: 15/012,826

(22) Filed: Feb. 1, 2016

(65) Prior Publication Data
US 2017/0123128 A1 May 4, 2017

(30) Foreign Application Priority Data
Oct. 28, 2015 (TW) .............................. 104135462 A

(51) Int. Cl.
*G02B 5/30* (2006.01)
*G02F 1/1335* (2006.01)
*G02B 1/02* (2006.01)
*G02B 5/02* (2006.01)
*G02F 1/13363* (2006.01)

(52) U.S. Cl.
CPC .............. *G02B 5/3083* (2013.01); *G02B 1/02* (2013.01); *G02B 5/0231* (2013.01); *G02B 5/3016* (2013.01); *G02F 1/13363* (2013.01); *G02F 1/133611* (2013.01); *G02F 2001/133614* (2013.01); *G02F 2202/36* (2013.01); *G02F 2413/08* (2013.01)

(58) Field of Classification Search
CPC .. G02B 5/3083; G02B 5/3016; G02B 5/0231; G02B 1/02; G02F 1/13363; G02F 1/133611; G02F 2001/133614

USPC ............. 359/487.06, 489.09, 489.11; 349/61
See application file for complete search history.

(56) References Cited

U.S. PATENT DOCUMENTS 9,146,419 B1 * 9/2015 Anandan ............. G02B 6/0035
2008/0128727 A1 * 6/2008 Erchak ............. G02F 1/133603
257/98

(Continued)

FOREIGN PATENT DOCUMENTS

CN 101573643 A 11/2009
CN 104360425 A 2/2015

(Continued)

*Primary Examiner* — Frank Font
(74) *Attorney, Agent, or Firm* — CKC & Partners Co., Ltd.

(57) ABSTRACT

Disclosed herein is a quantum rod film for a backlight unit. The quantum rod film includes a quantum rod layer having a plurality of quantum rods wherein major axes of the quantum rods are aligned along a direction; a micro-prism layer having a first refractive index and a plurality of parallel strip-shape prisms disposed at a light incident side of the quantum rod layer; and a birefringent layer on the micro-prism layer. By the refractive index difference between the first refractive index of the micro-prism layer and the extraordinary refractive index or the ordinary refractive index of the birefringent layer, the incident light parallel to the direction of major-axes of the quantum rods will selectively pass through the quantum rod film, and the incident light perpendicular to the direction of major-axes of the quantum rods will reflect to backlight for recycling and increasing the backlight efficiency.

10 Claims, 4 Drawing Sheets

(56) References Cited

U.S. PATENT DOCUMENTS

| | | | | |
|---|---|---|---|---|
| 2014/0340865 A1* | 11/2014 | Hikmet | ............ | G02F 1/133533 |
| | | | | 362/19 |
| 2016/0003998 A1* | 1/2016 | Benoit | ............. | G02F 1/133502 |
| | | | | 349/71 |
| 2016/0004124 A1* | 1/2016 | Benoit | ............. | G02F 1/133603 |
| | | | | 349/69 |
| 2016/0077259 A1* | 3/2016 | Saitoh | ..................... | G02B 5/26 |
| | | | | 362/84 |
| 2016/0091151 A1* | 3/2016 | Itoi | ..................... | G02B 6/0068 |
| | | | | 362/612 |

FOREIGN PATENT DOCUMENTS

| | | |
|---|---|---|
| CN | 104749681 A | 7/2015 |
| JP | 2006220879 A | 8/2006 |
| TW | 201502605 A | 1/2015 |

\* cited by examiner

QUANTUM ROD FILM

RELATED APPLICATIONS

This application claims priority to Taiwanese Application Serial Number 104135462, filed Oct. 28, 2015, which is herein incorporated by reference.

BACKGROUND

Field of Invention

This invention generally relates to a quantum rod film used in backlight unit of liquid crystal display for enhancing the gamut and light utilization of the liquid crystal display.

Description of Related Art

Polarizers commonly used in the liquid crystal display are absorptive polarizers. In the liquid crystal display, when the non-polarized light emitted from the backlight is incident onto the absorptive polarizers, a component of the incident light parallel to the absorption axis direction of the polarizers is absorbed and cannot pass through the absorptive polarizers. Therefore, after the light emitted from backlight passing through the absorptive polarizer, the light will lose at least 50%. In addition, after the light further passing through the polarizer, the electrode layer, color filter, liquid crystal module and glass substrate, only less than 10% of the light originally emitted from backlight can be transmitted to the observer. Accordingly, the light utilization of the backlight is quite low.

Several approaches to enhance the light utilization of the backlight have been proposed. For example, a brightness enhancement film (e.g., Dual Brightness Enhancement Film, DBEF) and/or a prism film may be used in backlight unit for continuously refracting and reflecting to recirculate and recycle the light which is unable to be transmitted by the polarizer. The light can to be redirected out of the backlight unit in order to enhance the brightness of the backlight. In another example, concentrating the light of large viewing angle area of the liquid crystal display can increase the luminance at viewing direction. However, those solutions may increase the luminance of the backlight unit of a liquid crystal display; no significant effect is provided to the gamut and the color saturation of the liquid crystal display.

Therefore, a solution is proposed by using quantum dots in backlight source to increase the gamut thereof. The quantum dot is a semiconductor material of zero-dimensional structure, and it is able to absorb UV light or blue light having shorter wavelength and emit green light or red light having longer wavelength to mix to emit white light source. Because the excitation spectrum of the quantum rods material is with a narrower full-width-at-half-maximum (FWHM), the gamut area of the liquid crystal display using the quantum dots will be more than 100% NTSC.

In addition, it is also proposed another approach that a quantum rod layer is integrated into the backlight unit. The quantum rod is a nano-scale semiconductor material. It is in a shape of a one-dimensional rod-like structure. The quantum rod film is different from the absorptive polarizer which absorbs non-polarizing light with evolution of heat. The quantum rod is able to absorb the non-polarized light to emit a polarized light with a wavelength longer than the original non-polarized light from the major axis direction thereof. Because of the high internal quantum efficiency, most of the incident light from the backlight source is polarized. The quantum rods are aligned in the direction of major axis, and the emitted polarized light is efficiently passed through the transmission axis of the polarizer disposed on the liquid crystal display. Accordingly, compared to the backlight unit with quantum dots, the light utilization of a backlight unit with the quantum rods will further be enhanced.

Usually, the dichroic ratio (DR) is used to evaluate the efficiency of transformed polarizing light emitted by quantum rod film. The dichroic ratio is obtained by an equation $DR=Y_{//}/Y_{\perp}$, wherein the $Y_{//}$ is the transmittance obtained as the major axis of the quantum rod film is parallel to the transmission axis of the detection polarizer; $Y_{\perp}$ is the transmittance obtained as the major axis of the quantum rod film is perpendicular to the transmission axis of the detection polarizer. When a light is not transmitted through a quantum rod film, the $Y_{//}$ and $Y_{\perp}$ are almost the same and thus the dichroic ratio is about 1. As the dichroic ratio is higher, the dichroism of the quantum rod film is significant. When a light is transmitted through a quantum rod film with a higher dichroism, the light will be transformed into a light with a better polarization and directionality. As using a quantum rod film in the stacked optical films of the current backlight unit, light will be reflected and refracted in and out of the optical films or be scattered by the particles composed in films such that dichroic ratio of the light excited by the quantum rod film passing through these optical films is going to be decreased. Thus, when the light generated from the backlight module with a quantum rod film passes through the polarizers of the liquid crystal display, the brightness of the display is not as expected.

Furthermore, as shown in FIG. 1, in the conventional quantum rod film 1 utilizing blue light ($L_B$) to emit red light ($L_R$) and green light ($L_G$), the film includes a substrate 2 and a plurality of quantum rods 3 distributed therein. When the major axes of the quantum rods 3 are aligned in x-axis direction, the component of the blue light ($L_B$) in x-axis is absorbed by quantum rods 3 to emit red light ($L_R$) and green light ($L_G$) in the same x-axis direction, the component of the blue light ($L_B$) in y-axis is most directly transmitted through the quantum rods 3 as transmitted blue light ($L_{B1}$). Since the direction of the transmitted blue light is different from that of the emitted red light ($L_R$) and green light ($L_G$), part of the transmitted blue light ($L_{B1}$) may not pass through the transmission axis of the polarizer of the liquid crystal display, the light utilization of the transmitted blue light is lower. When the more transmitted blue light ($L_{B1}$) passes through the transmission axis of conventional quantum rod film 1, the $Y_{\perp}$ component is more such that the dichroic ratio of the quantum rod film 1 is lower. Furthermore, if most of the blue light ($L_B$) directly passes through the quantum rods 3, the red light ($L_R$) and green light ($L_G$) are emitted less, and the light intensity will be insufficient. Therefore, it requires increasing the amount of the quantum rods 3 to maintain the desired color coordinate of mixed white light. The cost of the quantum rod film will increase. There is a demand for a novel quantum rod film which decreases the transmitted blue light ($L_{B1}$) in y-axis and increases the excitation number of the quantum rod 3 excited by the blue light ($L_B$) and the blue light utilization.

SUMMARY

According to one broad aspect of the invention, there is provided a novel, inventive and useful quantum rod film.

The present invention is to provide a quantum rod film. In a preferred embodiment of the present invention, the quantum rod film includes a plurality of quantum rods, wherein major axes of the quantum rods are aligned along a direction; a micro-prism layer including a plurality of parallel strip-shape prisms and disposed at a light incident side of the quantum rod layer with a first refraction index; and a birefringence layer on the micro-prism layer, the birefringence layer has an extraordinary refractive index in a direction which is parallel to the direction of the parallel strip-shape prisms extended on the micro-prism layer and an ordinary refractive index in a direction which is perpendicular to the direction of the parallel strip-shape prisms extended on the micro-prism layer, wherein when the extending direction of the parallel strip-shape prisms of the micro-prism layer is perpendicular to the major axes of the quantum rods, the extraordinary refractive index of the birefringence layer is more than the first refraction index of the micro-prism layer and the ordinary refractive index is equal to the first refraction index of the micro-prism layer; when the extending direction of the parallel strip-shape prisms of the micro-prism layer is parallel to the major axes of the quantum rods, the ordinary refractive index of the birefringence layer is more than the first refraction index of the micro-prism layer and the extraordinary refractive index is equal to the first refraction index of the micro-prism layer.

In a preferred embodiment of the quantum rod layer of the present invention, a first barrier is disposed between the quantum rod layer and the micro-prism layer, and a second barrier is disposed at the other side of the quantum rod layer opposite to the micro-prism layer.

In a preferred embodiment of the quantum rod layer of the present invention, the first refractive index of the micro-prism layer is between 1.4 and 1.7.

In a preferred embodiment of the quantum rod layer of the present invention, the prism angle of the prism of the micro-prism layer is between 80° and 110° to achieve a preferred light recycling of the backlight unit.

In a preferred embodiment of the quantum rod layer of the present invention, the material of the micro-prism layer is selected from the group consisted of polymethyl methacrylate, polyethylene terephthalate, cellulose triacetate and polyethylene.

In a preferred embodiment of the quantum rod layer of the present invention, the birefringence layer includes liquid crystals or birefringent crystal.

In a preferred embodiment of the quantum rod layer of the present invention, the lengths of the quantum rods are between about 10 nm and 50 nm; the aspect ratios of the quantum rods are between 5 and 10.

In a preferred embodiment of the quantum rod layer of the present invention, the quantum rods include quantum rods with same lengths or different lengths.

In a preferred embodiment of the quantum rod layer of the present invention, the quantum rods includes one or more semiconductor materials, the material of the quantum rods is a semiconductor material selected from the group consisted of group III-V, group II-VI and group IV-VI compounds.

In a preferred embodiment of the quantum rod layer of the present invention, a material of the first barrier and a material of the second barrier are independently selected from the group consisted of polyethylene terephthalate, polymethyl methacrylate, cyclo-olefin polymer, polysiloxanes, fluororesin polymer and metal oxide-containing organic/inorganic composite film.

DETAILED DESCRIPTION

The invention can be more fully understood by reading the following detailed description of the embodiment, with reference made to the accompanying drawings that illustrate the invention and it should be noted that the drawings are not to scale and only for illustration only.

The quantum rod film of the present invention will now be described in reference to the accompanying drawings. Similar numbers on the drawings refers to the same elements.

Figure 1:
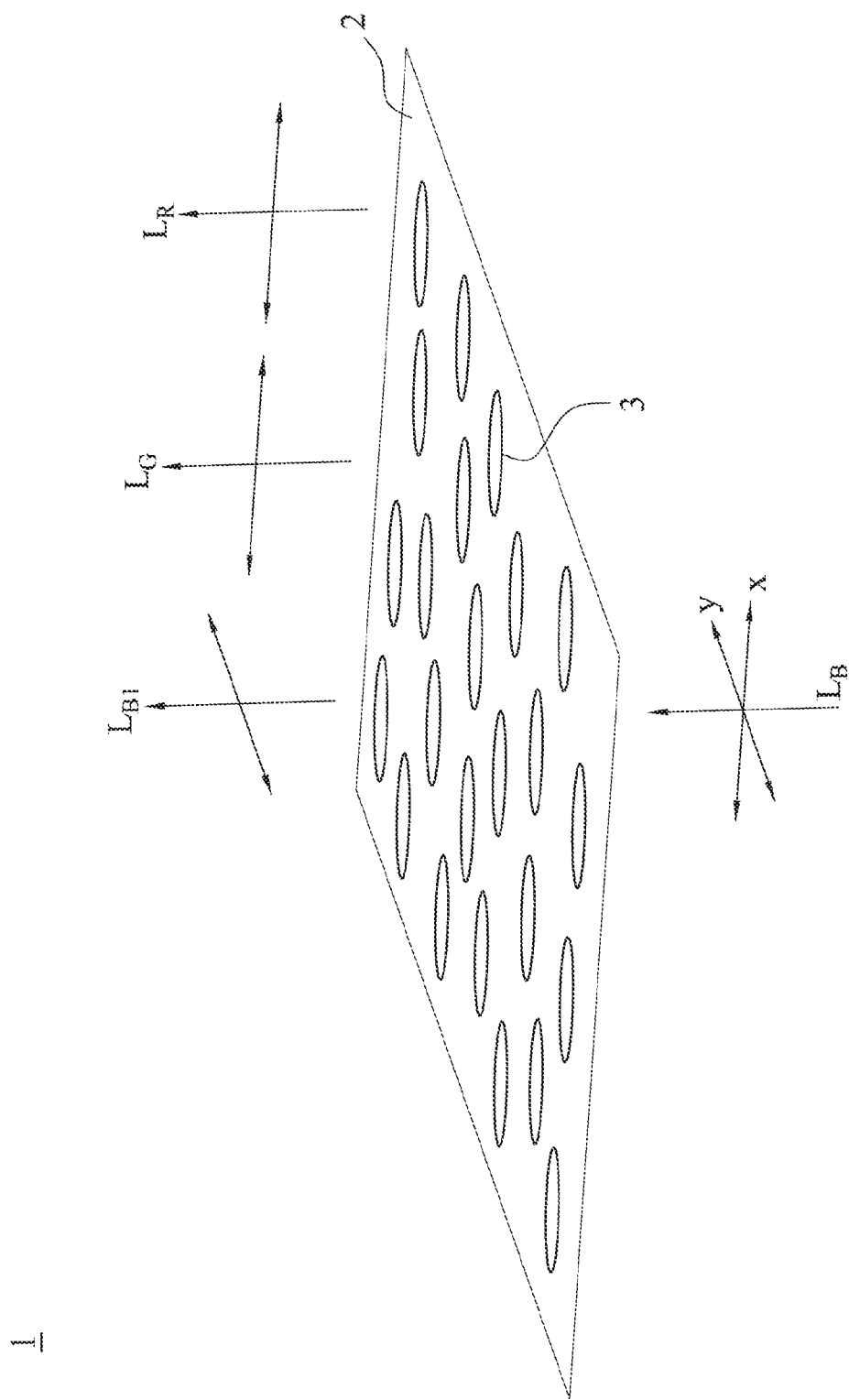
FIG. 1 is a perspective view of a quantum rod film in prior art.
Figure 2:
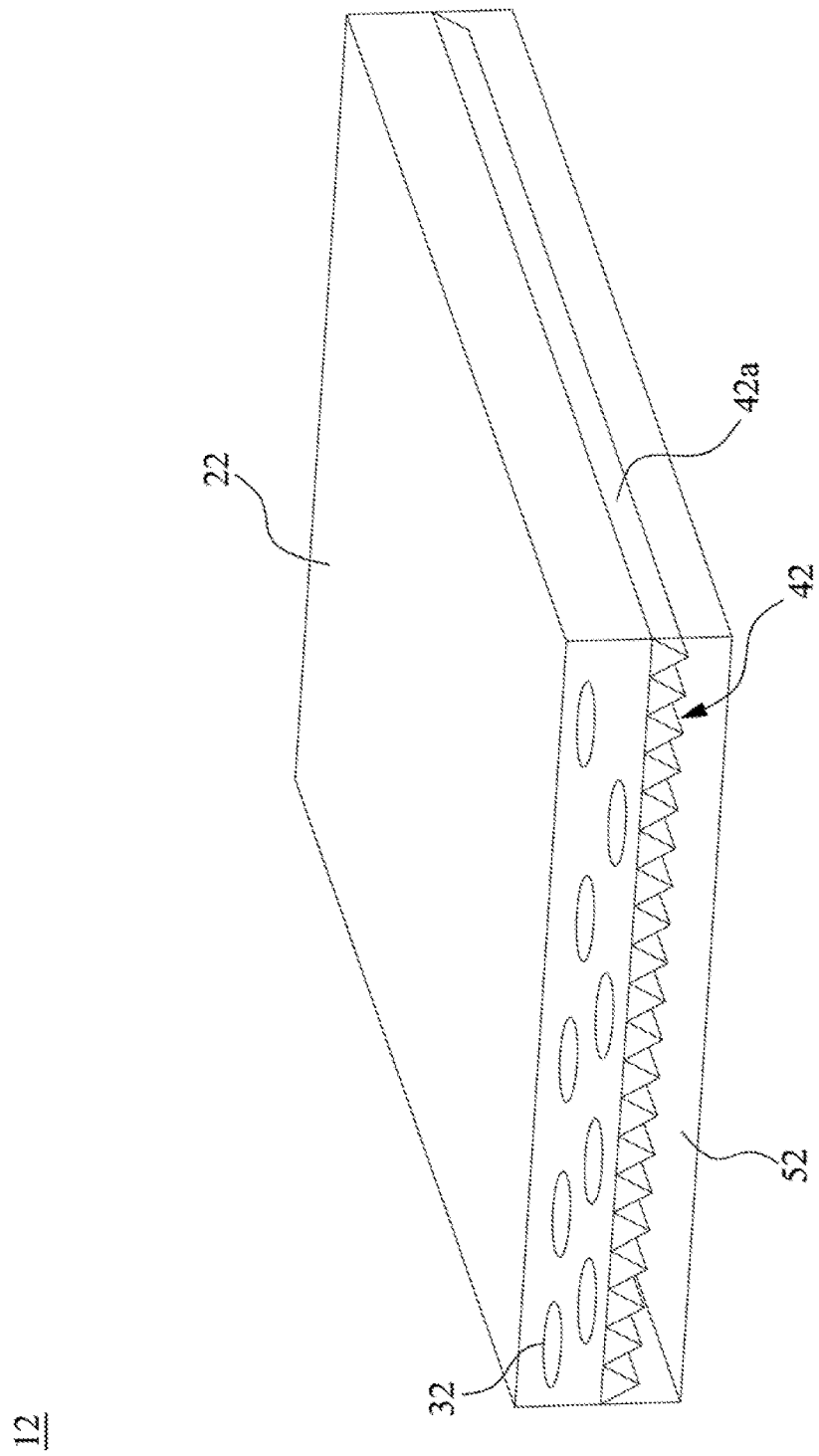
FIG. 2 is a perspective view of a quantum rod film of a preferred embodiment of the present invention.

Now referring to FIG. 2, it is a perspective view of a quantum rod film 12 of a preferred embodiment of the present invention. In a preferred embodiment of the present invention, the quantum rod film 12 includes a quantum rod layer 22 including a plurality of quantum rods 32, and major axes of the plurality of quantum rods 32 are aligned along a direction. A micro-prism layer 42 with a first refractive index (n) includes a plurality of parallel strip-shape prisms 42a and is disposed at a light incident side of the quantum rod layer 22. An extending direction of the parallel strip-shape prisms is perpendicular to the major axes of the quantum rods 32. A birefringence layer 52 is on the micro-prism layer 42. The birefringence layer 52 has an extraordinary refractive index $n_e$ in a direction which is parallel to the extending direction of the parallel strip-shape prisms 42a and an ordinary refractive index ($n_o$) in a direction perpendicular to the extending direction of the parallel strip-shape prisms 42a. The extraordinary refractive index ($n_e$) of the birefringence layer 52 is more than the first refraction index (n) of the micro-prism layer 42 and the ordinary refractive index ($n_o$) is equal to the first refractive index (n).

Figure 3:
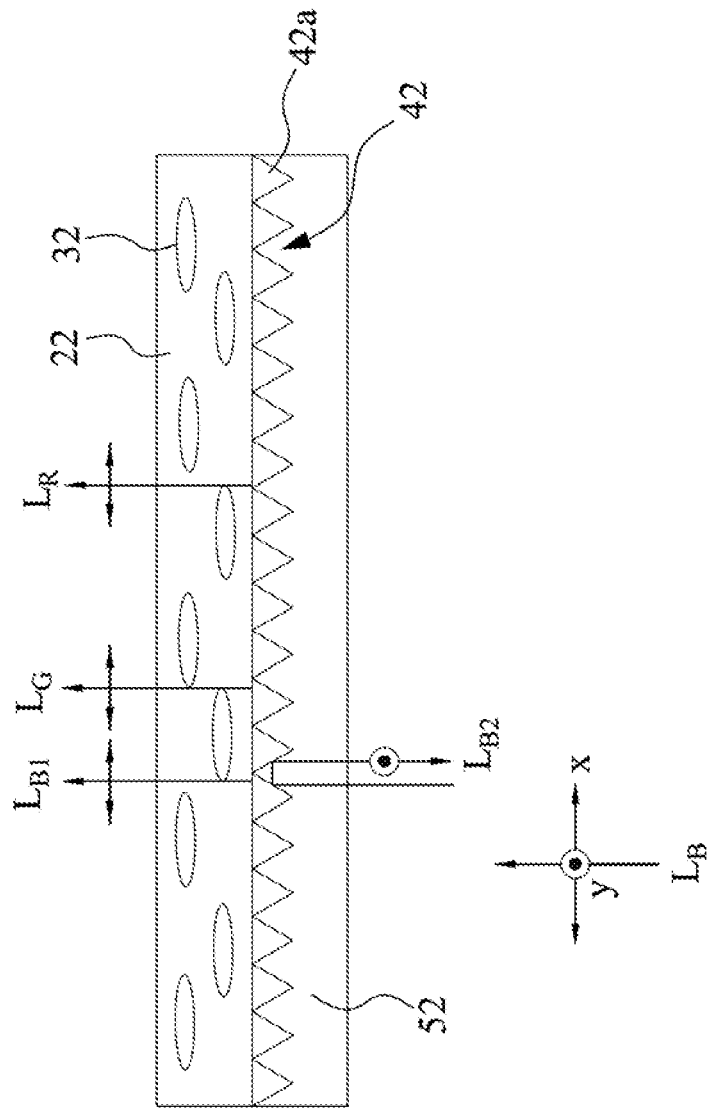
FIG. 3 is a perspective view showing the principle of the quantum rod film of a preferred embodiment of the present invention enhancing the utilization of the blue light backlight source.

Referring to FIG. 3, it is a perspective view showing the principle of a quantum rod film 12 of a preferred embodiment of the present invention enhancing the utilization of the blue light $L_B$ backlight source. When the plurality of the parallel strip-shape prisms 42a of the micro-prism layer 42 is arranged in a direction perpendicular to the major axes of the quantum rods 32 on the quantum rod layer 22, because the ordinary refractive index $n_o$ of the birefringence layer 52 in x-axis direction is equal to the first refractive index n of the micro-prism layer 42, the component of the blue light ($L_B$) in x-axis direction will not be affected by the difference of the refractive index of the interface between the birefringence layer 52 and the micro-prism layer 42 and is directly transmitted to the quantum rod layer as transmitted blue light ($L_{B1}$) and excites the quantum rods 32 to emit red light ($L_R$) and green light ($L_G$). The polarization direction of the transmitted blue light ($L_{B1}$) coincides to the polarization directions of the emitted red light ($L_R$) and green light ($L_G$). Therefore, the mixed-color white light has been adjusted to be coincided with the transmitted axis of the polarizer of liquid crystal panel, and the light transmittance will increase. The extraordinary refractive index ($n_e$) of the birefringence layer 52 in y-axis direction is more than the first refraction index (n) of the micro-prism layer 42; the component of the blue light ($L_B$) in y-axis direction will be total reflected on the interface between the birefringence layer 52 and the micro-prism layer 42 to emit the reflected blue light ($L_{B2}$).

Since the polarization direction of the reflected blue light ($L_{B2}$) is different from the emitted red light ($L_R$) and green light ($L_G$), the reflected blue light ($L_{B2}$) transmitted to the micro-prism layer 42 to generate the mixed-color white light will decrease the dichroic rate of the quantum rod film 12. Therefore, to reflect and recycle the reflected blue light ($L_{B2}$) in y-axis direction will increase the light utilization of the backlight unit.

In a preferred embodiment of the quantum rod layer of the present invention, a first barrier is interposed between the quantum rod layer and the micro-prism layer and a second barrier is disposed on the other side of the quantum rod layer opposed to the micro-prism layer in order to form a encapsulation structure for barring the moisture and oxygen to enhance the weatherability and durability of the quantum rod film.

In a preferred embodiment of the quantum rod layer of the present invention, the first refractive index of the micro-prism layer is between 1.4 and 1.7.

In a preferred embodiment of the quantum rod layer of the present invention, the prism angle of the prism of the micro-prism layer is between 80° and 110° to achieve a preferred light recycling of the backlight unit.

In a preferred embodiment of the quantum rod layer of the present invention, the material of the micro-prism layer is selected from the group consisted of polymethyl methacrylate, polyethylene terephthalate, cellulose triacetate and polyethylene.

In a preferred embodiment of the quantum rod layer of the present invention, the birefringence layer includes liquid crystals, such as A-plate liquid crystal or birefringent crystal, treated with rubbing to enable the major axes of the liquid crystals to be aligned with the direction of the parallel strip-shape prisms of the micro-prism layer.

In a preferred embodiment of the quantum rod layer of the present invention, the lengths of the quantum rods are between about 10 nm and 50 nm; the aspect ratios of the quantum rods are between 5 and 10.

In a preferred embodiment of the quantum rod layer of the present invention, the quantum rods include quantum rods with same lengths or different lengths. The intensity of the transmitted blue light, the emitted red light and the green light can be determined by adjusting the amount of the quantum rods of different length in order to mix and generate a white light to be used as a backlight source. The full width at half maximum for the emission spectrum of the quantum rod is narrow so that a wide gamut of a liquid crystal display can be obtained.

In a preferred embodiment of the quantum rod layer of the present invention, the quantum rods includes one or more semiconductor materials, the material of the quantum rods is a semiconductor material selected from the group consisted of group III-V, group II-VI and group IV-VI compounds, such as, AlN, AlP, AlAs, AlSb, GaN, GaP, GaAs, GaSb, InN, InP, InSb, ZnO, ZnS, ZnSe, ZnTe, CdS, CdSe, CdTe, HgSe, HgTe, PbS, PbSe and PbTe.

In a preferred embodiment of the quantum rod layer of the present invention, a material of the first barrier and a material of the second barrier are independently selected from the group consisted of polyethylene terephthalate, polymethyl methacrylate, cyclo-olefin polymer, polysiloxanes, fluororesin polymer and metal oxide-containing organic/inorganic composite film.

Figure 4:
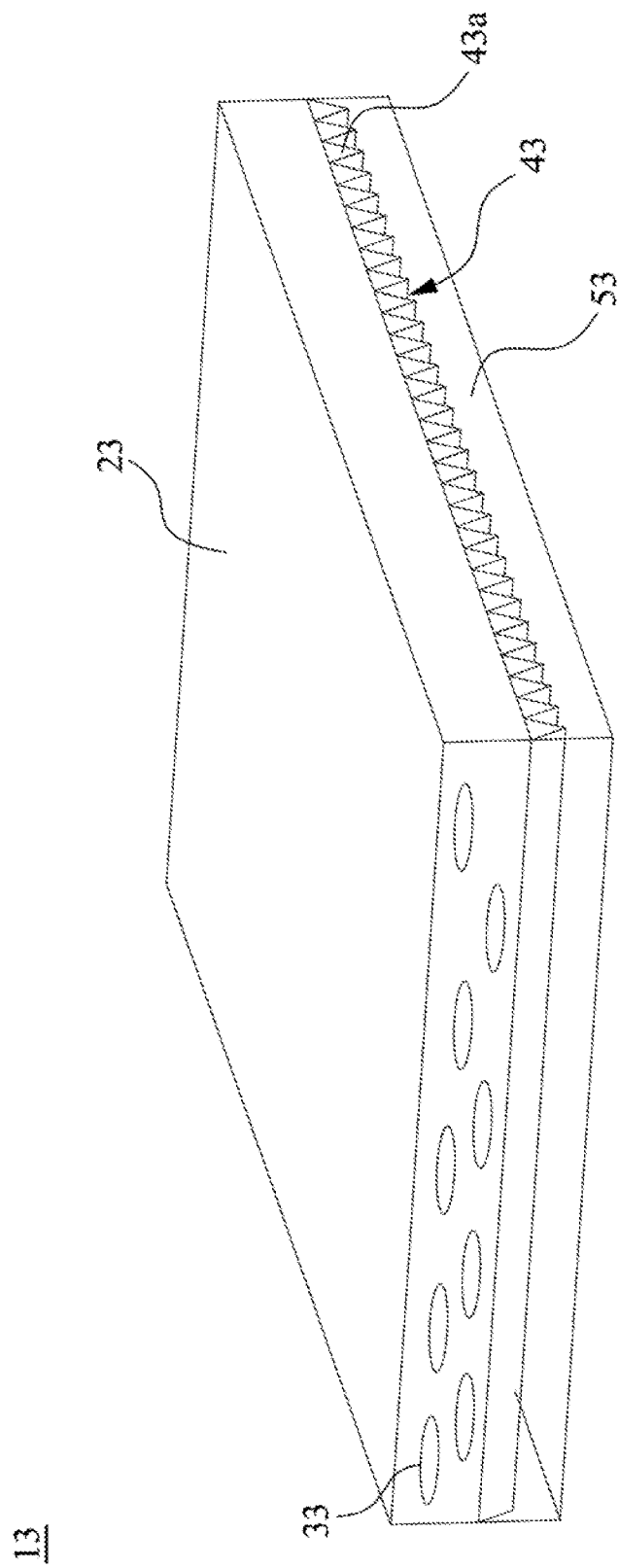
FIG. 4 is a perspective view of a quantum rod film of another preferred embodiment of the present invention.

Referring to FIG. 4, it is a perspective view of a quantum rod film 13 of another preferred embodiment of the present invention. In a preferred embodiment of the present invention, the quantum rod film 13 includes a quantum rod layer 23 including a plurality of quantum rods 33. The major axes of the plurality of quantum rods 33 are aligned along a direction. A micro-prism layer 43 with a first refraction index (n) includes a plurality of parallel strip-shape prisms 43a and is disposed at light incident side of the quantum rod layer 23. An extending direction of the parallel strip-shape prisms is parallel to the major axes of the quantum rods 33. A birefringence layer 53 is on the micro-prism layer 43. The birefringence layer 53 has an extraordinary refractive index ($n_e$) in a direction which is parallel to the extending direction of the parallel strip-shape prisms 43a, and an ordinary refractive index ($n_o$) in a direction which is perpendicular to the extending direction of the parallel strip-shape prisms 43a. The ordinary refractive index ($n_o$) of the birefringence layer 53 is more than the first refractive index (n) of the micro-prism layer 43 and the extraordinary refractive index ($n_e$) of the extraordinary light is equal to the first refraction index (n).

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A quantum rod film, comprising:
   a quantum rod layer comprising a plurality of quantum rods, wherein major axes of the quantum rods are aligned along a direction;
   a micro-prism layer comprising a plurality of parallel strip-shape prisms and disposed at a light incident side of the quantum rod layer with a first refractive index, and an extending direction of the parallel strip-shape prisms being perpendicular to the major axes of the quantum rods; and
   a birefringence layer on the micro-prism layer, having an extraordinary refractive index in a direction which is parallel to the extending direction of the parallel strip-shape prisms and an ordinary refractive index in a direction which is perpendicular to the extending direction of the parallel strip-shape prisms;
   wherein the extraordinary refractive index of the birefringence layer is greater than the first refraction index of the micro-prism layer and the ordinary refractive index is equal to the first refraction index of the micro-prism layer.

2. The quantum rod film of claim 1, further comprising a first barrier disposed between the quantum rod layer and the micro-prism layer, and a second barrier disposed at the other side of the quantum rod layer opposite to the micro-prism layer.

3. The quantum rod film of claim 1, wherein the first refractive index of the micro-prism layer is between 1.4 and 1.7.

4. The quantum rod film of claim 1, wherein a prism angle of the prism of the micro-prism layer is between 80° and 110°.

5. The quantum rod film of claim 1, wherein a material of the micro-prism layer is selected from a group consisting of polymethyl methacrylate, polyethylene terephthalate, cellulose triacetate and polyethylene.

6. The quantum rod film of claim 1, wherein the birefringence layer comprises liquid crystals or birefringent crystal.

7. The quantum rod film of claim 1, wherein lengths of the quantum rods are between about 10 nm and 50 nm; the aspect ratios of the quantum rods are between 5 and 10, and the quantum rods comprise quantum rods with same lengths or different lengths.

8. The quantum rod film of claim 1, wherein the quantum rods comprises one or more semiconductor materials, the material of the quantum rods is a semiconductor material selected from the group consisting of group III-V, group II-VI and group IV-VI compounds.

9. The quantum rod film of claim 2, wherein a material of the first barrier and a material of the second barrier are independently selected from the group consisting of polyethylene terephthalate, polymethyl methacrylate, cycloolefin polymer, polysiloxanes, fluororesin polymer, and metal oxide-containing organic/inorganic composite film.

10. A quantum rod film, comprising:
a quantum rod layer comprising a plurality of quantum rods, wherein major axes of the quantum rods are aligned along a direction;
a micro-prism layer comprising a plurality of parallel strip-shape prisms and disposed at a light incident side of the quantum rod layer with a first refractive index, and an extending direction of the parallel strip-shape prisms being parallel to the major axes of the quantum rods; and
a birefringence layer on the micro-prism layer, the birefringence layer has an extraordinary refractive index in a direction which is parallel to the extending direction of the parallel strip-shape prisms and an ordinary refractive index in a direction which is perpendicular to the extending direction of the parallel strip-shape prisms;
wherein the ordinary refractive index of the birefringence layer is greater than the first refraction index of the micro-prism layer and the extraordinary refractive index is equal to the first refraction index of the micro-prism layer.

* * * * *